United States Patent [19]

Motamedi et al.

[11] Patent Number: 5,079,946
[45] Date of Patent: Jan. 14, 1992

[54] VALVE POSITION SENSOR DIAGNOSTIC

[75] Inventors: Nader Motamedi, Brentwood, Tenn.; William J. Bolander, Clarkston; Michael R. Witkowski, Sterling Heights, both of Mich.

[73] Assignees: Delco Electronics Corp., Kokomo, Ind.; Saturn Corp., Troy, Mich.

[21] Appl. No.: 603,034

[22] Filed: Oct. 25, 1990

[51] Int. Cl.⁵ .................................... G01M 15/00
[52] U.S. Cl. ......................................... 73/118.1
[58] Field of Search ..................... 73/118.1, 168; 364/424.01

[56] References Cited

U.S. PATENT DOCUMENTS

| | | |
|---|---|---|
| 4,471,741 | 9/1984 | Asik et al. ............................ 123/478 |
| 4,615,321 | 10/1986 | Haefner et al. ...................... 123/479 |
| 4,665,871 | 5/1987 | Shimomura et al. ................ 123/352 |
| 4,799,467 | 1/1989 | Ishikawa et al. .................... 123/399 |
| 4,836,016 | 6/1989 | Nakano et al. ...................... 73/118.1 |
| 4,951,206 | 8/1990 | Kyohzuka ............................ 73/118.1 |

Primary Examiner—Robert Raevis
Attorney, Agent, or Firm—Howard N. Conkey

[57] ABSTRACT

A throttle valve diagnostic apparatus monitors the integrity of a throttle valve position sensor in an internal combustion engine using an engine parameter indirectly related to the value position. If the absolute pressure of the air in the intake manifold associated with the throttle valve is less than a predetermined pressure for a predetermined amount of time while the position sensor indicates a valve position greater than a predetermined position, the valve position sensor is assumed to be faulty.

6 Claims, 3 Drawing Sheets

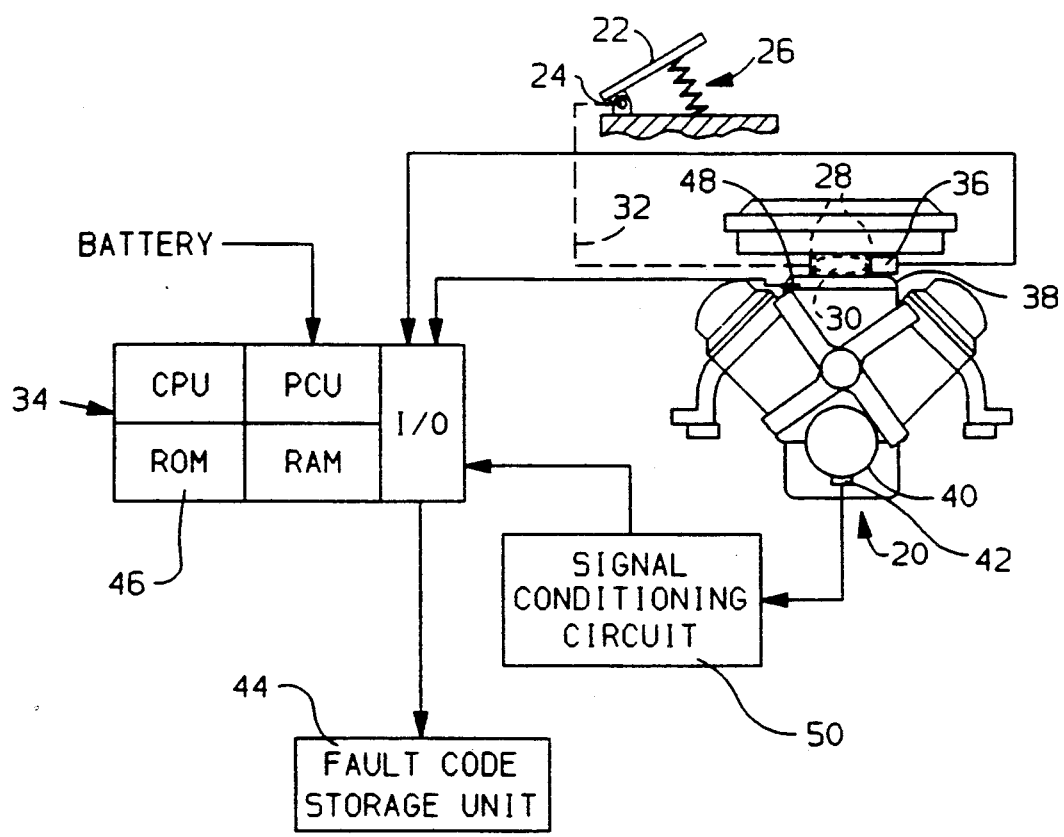
FIG. 1
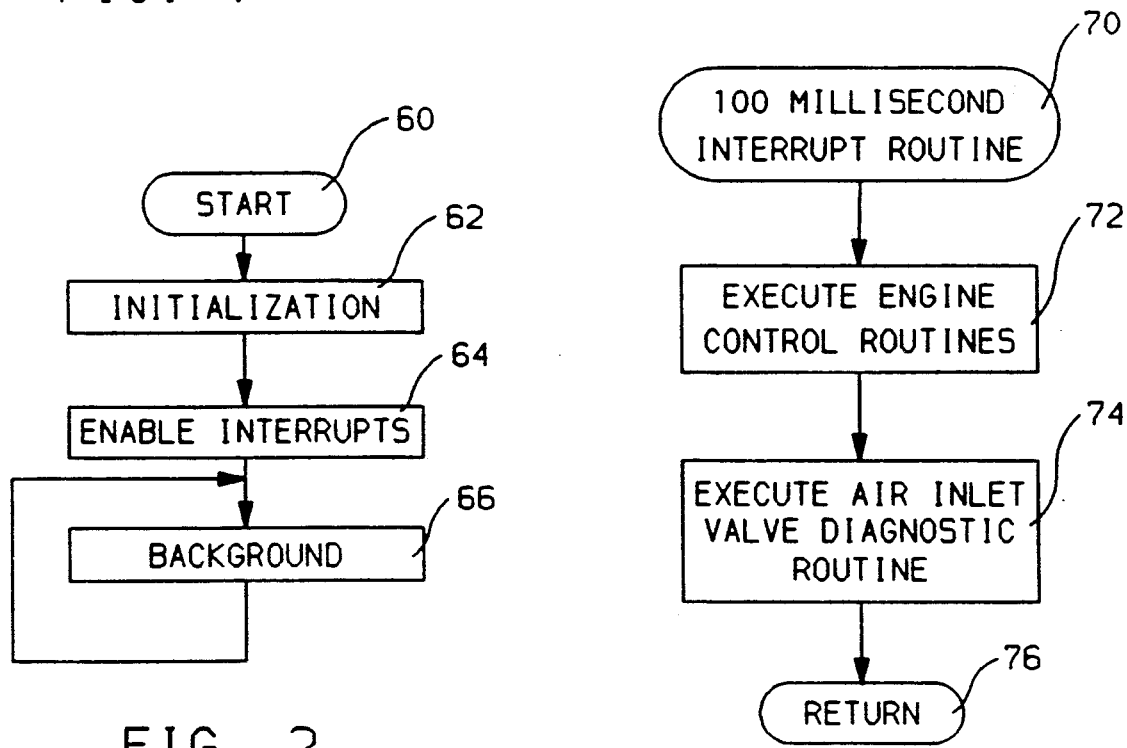
FIG. 2
FIG. 3

VALVE POSITION SENSOR DIAGNOSTIC

FIELD OF THE INVENTION

This invention relates to an apparatus for detecting faults in sensors used to measure the throttle position in internal combustion engines.

BACKGROUND OF THE INVENTION

Internal combustion engines that rely on electronic control must have some means of sensing the various mechanical states of the engine. Consequently, numerous sensors, such as the conventional throttle position sensor, are associated with such engines, and are often located in harsh environments where temperature extremes, moisture and vibration can reduce sensor life.

The throttle position sensor provides a signal commonly used in engine control, such that it is important that means exist by which the integrity of that signal can be monitored. Evaluation of the integrity of this sensor is complicated by its indirect relationship to other engine states and by sensor output signal pollution from engine noise and system disturbances.

Techniques for checking the integrity of the throttle position sensor are in the prior art. Redundant sensors are commonly used to provide a means for sensor signal cross-verification. However, sensor tolerances can vary widely making only more expensive, precise sensors suitable for this technique. Additionally, if both sensors fail in a similar manner due to a failure in a non-redundant part of the system, they may continue to agree with each other, and the failure will go undetected. Sensor integrity can only be fully monitored by complete sensor redundancy which can add substantial cost to a system. Finally, transient signals can appear on the output signal of either sensor and may lead to an incorrect diagnosis of a fault.

SUMMARY OF THE INVENTION

This invention overcomes the limitations of the prior art by monitoring the measured value of an engine state directly dependent on throttle position, and by using that value to judge the integrity of the throttle position sensor.

Specifically, if the rate of change of the position of the throttle valve does not exceed a predetermined rate of change and if the throttle valve position exceeds a predetermined position, the absolute pressure of the air in the engine intake manifold downstream of the throttle valve should always exceed a predetermined pressure. If, under these conditions, the absolute pressure is less than the predetermined pressure for a predetermined time, the throttle position sensor is presumed to be faulty as a pressure less than the predetermined pressure is not obtainable within that range of throttle positions.

This technique uses hardware already available with most conventional engine control systems and requires minimal supporting software, adding little cost to the system. The integrity of the throttle position sensor is monitored by a state affected by throttle position—not affected by the throttle position sensor—thereby reducing the probability that a fault in this sensor will go undetected. Finally, a potentially faulty condition must exist for a predetermined time to be diagnosed as a fault, reducing the chance that a transient condition will be improperly diagnosed as a fault.

DESCRIPTION OF THE DRAWINGS

FIG. 1 is a general diagram of the diagnostic system for monitoring the integrity of the throttle position sensor in accord with this invention.

FIG. 2 through 4 are computer flow diagrams illustrating the operation of the engine controller of FIG. 1 in accord with this invention.

DESCRIPTION OF THE PREFERRED EMBODIMENT

Figure 4:
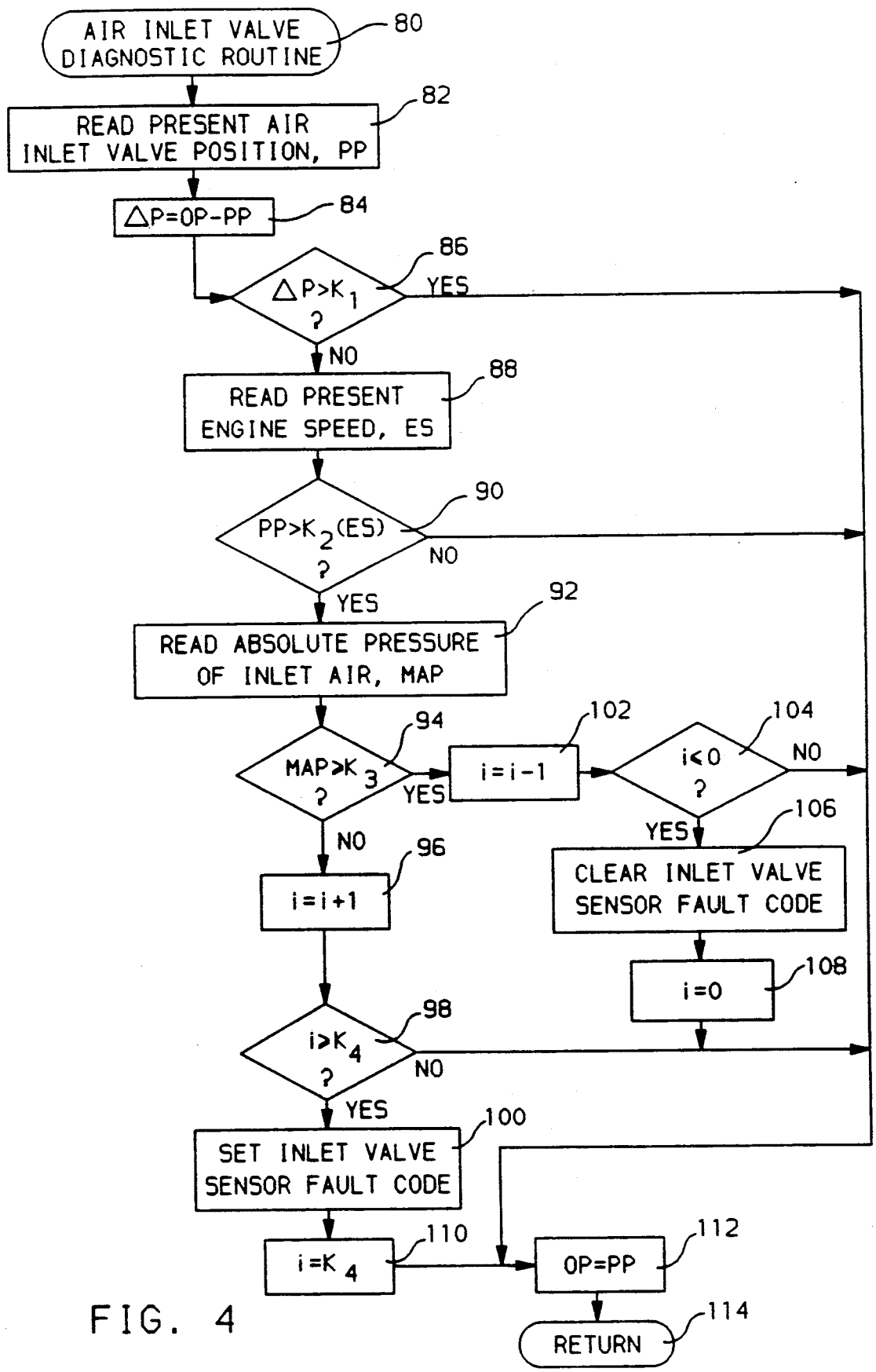

Referring to FIG. 1, the air flow rate of an internal combustion engine 20 and thus the engine operating speed is controlled according to a command received from an operator of the engine. The operator applies a force to an accelerator pedal 22 of the engine tending to rotate the pedal about a pivot 24 to an off idle position in opposition to a return force exerted by a spring 26 tending to rotate the pedal to an engine idle position.

Air is drawn through an inlet bore 28 of the engine 20, wherein a conventional throttle valve 30 is located which, in proportion to the force applied to the pedal by the operator, admits an amount of air into the engine. In this embodiment, the valve 30 consists of a conventional throttle blade rotatably mounted in the inlet bore 28 of the engine. The blade is linked to the pedal, such as by a conventional cable link 32, so that as the operator applies a force to the pedal, displacing it away from its engine idle position, the blade is rotated away from its closed position by a proportional amount, to regulate airflow into the engine intake manifold.

A throttle position sensor 36 is associated with the throttle blade 30 to measure the position of the blade with respect to the air inlet 28 corresponding to the amount of air allowed into the engine. In this embodiment, the position sensor 36 is a common rotary potentiometer with a wiper that rotates with respect to an electrically resistive track as the blade 30 rotates with respect to the air inlet 28. The resistance between the output terminals of the potentiometer 36, proportional to the displacement of the blade away from its closed position, is transmitted to and monitored by an engine controller 34, such that the controller has a measurement of the angular position of the blade 30 with respect to the air inlet 28.

Fuel is mixed with the air drawn into the engine 20 such as by conventional fuel injectors, not illustrated. This fueling is controlled in a conventional manner by the the engine controller 34 so as to achieve a desired air-fuel ratio.

A conventional pressure sensor 48 for measuring the absolute pressure of the air within the intake manifold 38 is located in the manifold. The sensor transduces the pressure to a voltage proportional to the intake manifold absolute pressure, the voltage being transmitted to the engine controller 34 as a measure of the manifold absolute pressure MAP.

A rotational speed sensor 42 is located in proximity to the crankshaft of the engine 40 to sense the rotational speed of the crankshaft. In this embodiment, this sensor is a conventional magnetic field sensing device that senses changes in the magnetic field immediately surrounding its tip resulting from passage of the teeth of a conventional ring gear, typically driven by the crankshaft 40. The resultant alternating waveform, having a frequency proportional to the engine speed ES is transmitted to a conventional signal conditioning circuit 50 where it is conditioned to meet the input requirements of the engine controller 34. It is then transmitted to the input circuitry of the engine controller as a measure of engine speed.

The engine controller 34, in carrying out the principles of this invention, monitors throttle blade position. When the throttle blade is relatively steady in position such that its rate of change is below a predetermined rate of change, the controller 34 calculates a throttle blade position value proportional to the sensed engine speed. If the throttle blade position exceeds that calculated value, the absolute pressure of the air in the intake manifold should not, under fault-free operation, be less than a predetermined calibration pressure. If the absolute pressure is less than the predetermined pressure for a predetermined time while the throttle position exceeds the calculated position, a throttle position sensor fault is assumed to have occurred and the controller 34 sends a fault code to the fault code storage unit 44. Conversely, if the absolute pressure is not less than the predetermined pressure for a predetermined time, the fault code is cleared.

The engine controller 34 takes the form of a standard digital computer, such as a Motorola MC68HC11 single chip microcomputer. The principles of this invention are implemented in the form of an operating program stored in the computer's read only memory 46.

Referring to FIG. 2, when power is first applied to the system such as when the vehicle ignition switch is turned to its "on" position, the engine controller initiates the engine control program at step 60 and then proceeds to step 62 where the controller provides for system initialization. For example, at this step data constants are transferred from ROM locations to RAM locations and counters, flags and pointers are initialized.

After the initialization step, the controller proceeds to step 64, where any interrupts used in the execution of the control program are enabled. The interrupt used to execute the routine incorporating the principles of this invention is enabled at this step. The controller then proceeds to a background loop at step 66 which is continuously repeated. This loop may include system diagnostic and maintenance routines. In this preferred embodiment, the controller interrupts the background loop every 100 milliseconds to execute the routine incorporating the principles of this invention.

This routine is illustrated in FIG. 3, and is entered at step 70. The controller proceeds to step 72 where conventional engine control and diagnostics routines may be executed. The controller then, at step 74, executes the throttle position sensor diagnostic routine incorporating the principles of this invention. The controller then returns to the background loop via step 76.

The steps involved in carrying out the throttle position sensor diagnostic routine are illustrated in FIG. 4. The controller enters the routine at step 80, and proceeds to step 82, where the present throttle blade position PP is read. Next, at step 84, the difference between PP and the most recent stored value of the throttle position OP is calculated as $\Delta P$. The value $\Delta P$ therefore represents the time rate of change of the throttle position, or the amount of change of throttle position over the fixed time interval between successive iterations of this routine.

Next, at step 86, $\Delta P$ is compared to a predetermined difference $K_1$, which defines the cutoff value above which the throttle blade is considered not to be in the steady state. In principle, this routine relates throttle position to manifold absolute pressure. However, this routine cannot proceed when the blade position is changing rapidly (is not in its steady state). For given engine conditions, a change in throttle blade position will, after a period of time, result in a change in manifold pressure. If the throttle blade position is changing rapidly, readings of manifold pressure quickly become obsolete and cannot be related to the present throttle position. Consequently, a meaningful comparison between manifold pressure and throttle blade position can only be made when the blade is relatively steady. In this embodiment, $K_1$ is predetermined according to the following equation $$K_1 = 0.02(P_1 - P_o)$$

where $P_1$ is the throttle position corresponding to wide open throttle and $P_o$ is the throttle position corresponding to a closed throttle. This predetermined value is stored in ROM and is loaded into system RAM during the initialization of step 62 of FIG. 2. Therefore, in this embodiment, the throttle blade is considered to be in its steady state if it has not changed by more than two percent of its overall range between successive 100 millisecond iterations of this algorithm.

If the blade is not determined to be in its steady state, the controller proceeds to step 112, where the present sensed pressure value PP is stored in RAM as the old pressure value OP, for use the next time the routine is executed. The controller then exits this routine at step 114 and returns to step 76 of FIG. 3.

Figure 5:
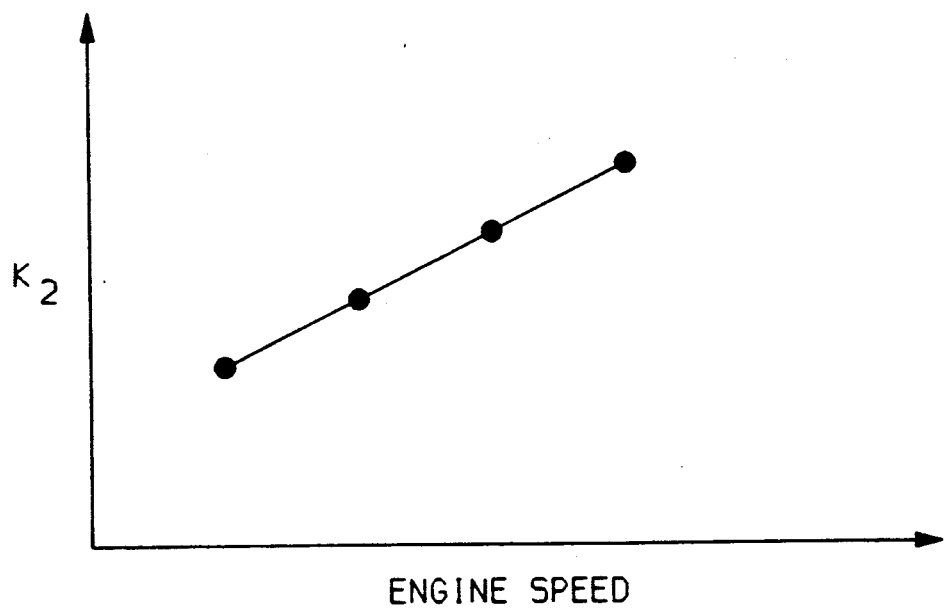
FIG. 5 is a diagram illustrating the relationship between engine speed and a throttle position threshold value in accord with the principles of this invention.

If the blade is determined to be in its steady state at step 86, the present engine speed ES is read at step 88. A throttle position calibration value $K_2$, which is a function of ES and a third value $K_3$, which will be discussed shortly, is next determined at step 90 and is compared to the present throttle position PP. In this embodiment, $K_2$ is determined from a piecewise linear model of throttle position versus engine speed as illustrated in FIG. 5. Four points were chosen to define the model over the entire engine operating range in accord with this embodiment, but more points may be used for increased model precision. $K_2$ is related to $K_3$ in that when the sensed throttle position exceeds $K_2$, the manifold absolute pressure MAP may be compared to $K_3$ and, in normal operation, should never be less than $K_3$.

Accordingly, $K_2$ and $K_3$ are values that must be predetermined based on the characteristics of the system to be monitored over the range of possible engine speeds. Once one value is chosen, the other may be found experimentally. For example, by selecting a value for K3, a value for $K_2$ may then be determined as the throttle position for a given engine speed at which the manifold absolute pressure should never be below that selected value of $K_3$.

As FIG. 5 illustrates, $K_2$ increases in proportion to engine speed. Consequently, as engine speed increases, the "unobtainable region", shown in FIG. 6, of manifold absolute pressure shrinks, or lower values of throttle posit[on may correspond to MAP values which would, under normal engine operation, be less than $K_3$. Low MAP values, specifically MAP values below $K_3$, may exist at high engine speeds and low throttle position values due to a large air demand from the engine, a small air inlet, and thus a large pressure drop across the inlet. As such, in this embodiment, MAP and $K_3$ are compared when engine speed and throttle blade position indicate that a MAP value should never lie below $K_3$. Should MAP lie below $K_3$, the throttle blade is assumed to be at a lower value than the throttle position sensor indicates, and the throttle position sensor is assumed to be faulty.

Returning to step 90 of FIG. 4, if the present throttle position PP is below $K_2$, the throttle position sensor is assumed, for the purposes of this routine, to be operating properly as a meaningful evaluation of the manifold pressure cannot then be made. Additionally, if PP is below $K_2$ then the throttle position sensor is assumed not to be sticking—a common failure mode for this sensor—as normal driving would eventually push a sticking throttle position sensor to a position in excess of $K_2$. In either case, the controller exits this routine in the manner discussed, by saving the present pressure in RAM as the old pressure value at step 112, and by proceeding to step 114, where the controller returns to step 76 of the routine of FIG. 3.

Alternatively, if at step 90 of FIG. 4, PP exceeds $K_2$, the controller proceeds to step 92 where the absolute pressure of the air in the intake manifold MAP is measured. Next, at step 94, MAP is compared to the predetermined pressure threshold value $K_3$, which represents the start of a region shown in FIG. 6 as the unobtainable pressure region, within which a MAP measurement may indicate a system fault.

Figure 6:
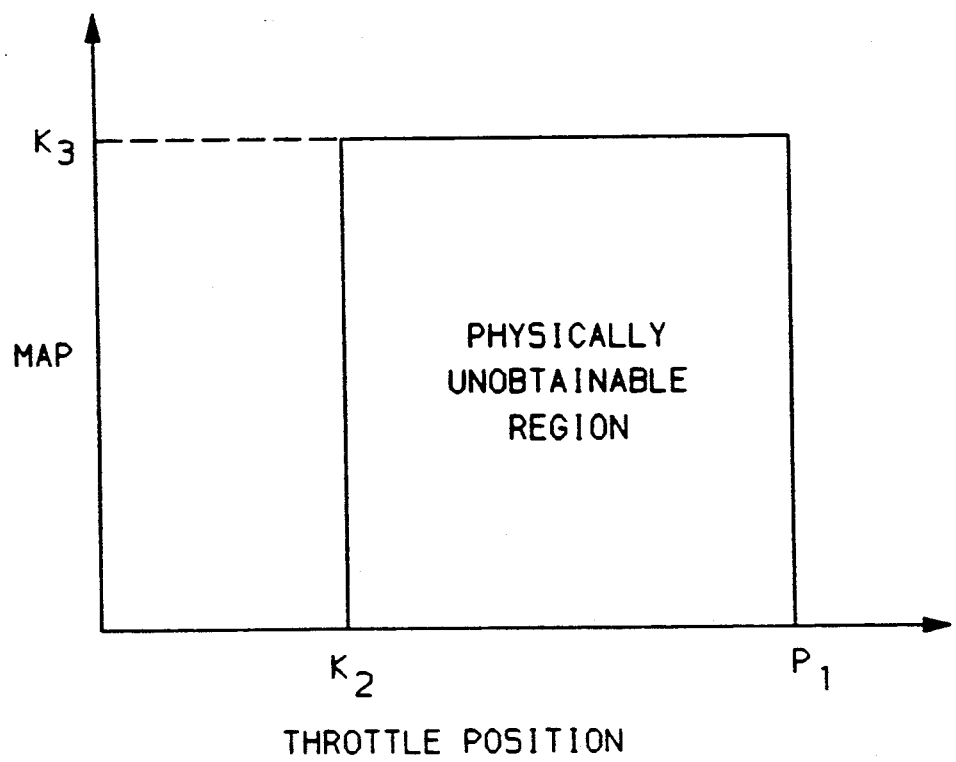
FIG. 6 is a diagram illustrating the relationship between the magnitude of the manifold absolute air pressure and the position of the throttle valve in accord with the principles of this invention.

The relationship between MAP and throttle position is illustrated in FIG. 6. There is a physical limit of MAP, shown as $K_3$ which, when throttle position is greater than $K_2$, should never exceed the measured MAP value. If the throttle blade is nearly closed, imposing a large restriction on incoming air, a large pressure drop is possible across the blade. However, as the blade opens, an increasing amount of air is allowed to pass through, decreasing the pressure drop through the inlet.

Experimentation has shown that a certain throttle blade opening $K_2$ can be determined as a function of engine speed such that for any blade position more open than $K_2$, the absolute pressure of the air below the blade cannot be less than a calibrated value $K_3$, which is determined based on the physical characteristics of the throttle bore, the throttle blade and the intake manifold. This provides a convenient means of checking the integrity of the throttle position sensor. If the sensor indicates that the throttle blade position is more open than $K_2$, the pressure measured in the intake manifold should never be below $K_3$. If the pressure is below $K_3$, a throttle position sensor fault may exist.

In this embodiment, the MAP limit, $K_3$, was chosen as 55 kiloPascals (kPa), but this limit may vary depending on the physical characteristics of the system being monitored, as discussed.

Returning to step 94 of FIG. 4, if the measured pressure is below $K_3$, an occurrence counter i is incremented at step 96. Next, at step 98, if i exceeds or is equal to a predetermined value $K_4$, a throttle position sensor error code is set in the memory of the engine controller. Upon servicing the engine, a service technician can read the code and immediately identify the fault, which he can cure by any conventional off-line fault treatment scheme.

$K_4$ is a means by which transient excursions from the range of acceptable pressure values are tolerated by the routine. These excursions are common in engine diagnostic systems susceptible to noise and disturbances, are usually of short duration, do not usually result in reduced performance, and therefore are not immediately diagnosed as faults. In this embodiment, $K_4$ is set to five, such that five cumulative pressure excursions must exist before a fault code is stored in memory. If i has been incremented to the value of $K_4$, the controller limits the value to the value of $K_4$ at step 110, such that the system may still self-correct in the predetermined amount of time by decrementing the counter to zero if five cumulative pressure readings lie within the acceptable range. The controller then, at step 112, saves the present pressure reading as the old pressure reading and, at step 114, returns to the routine of FIG. 3. At step 98, if i is less than $K_4$, the controller returns to the routine of FIG. 3 via steps 112 and 114.

Returning to step 94, if the MAP value exceeds or is equal to $K_3$, a fault-free condition is assumed for the purposes of this invention, and the occurrence counter is decremented by one at step 102. If, at step 104, the counter value is at or below zero, the throttle position sensor fault code is cleared, if necessary, at step 106. Thus the routine, even if a previous fault has been diagnosed, may continue operation with no fault indication at all, once the sensor is deemed to be operating correctly over the prescribed period of time. Next, the counter is limited to a minimum value of zero at step 108, such that at any time five cumulative pressure excursions will be diagnosed as a fault. The controller then returns to the routine of FIG. 3 via steps 112 and 114, as discussed. Returning to step 104, if the counter value is greater than zero, the controller returns to the routine of FIG. 3 immediately through steps 112 and 114.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. An apparatus for determining the integrity of a measurement of a position of a valve regulating air inlet to an intake manifold of an internal combustion engine, comprising
   valve position sensing means for sensing said position of said valve;
   means for calculating a time rate of change of said position of said valve;
   means for sensing the pressure of the air in said intake manifold;
   means for comparing said sensed pressure value to a predetermined pressure value when said time rate of change of said position of said valve does not exceed a predetermined time rate of change and when said sensed valve position value exceeds a predetermined valve position value; and
   fault indicating means for indicating the presence of a fault in said valve position sensing means when said predetermined pressure value exceeds said sensed pressure value.

2. The apparatus of claim 1, wherein said predetermined valve position value further comprises a value proportional to a rotational speed of an output shaft of said engine.

3. The apparatus of claim 1, wherein said fault indicating means further comprises means for indicating the non-existence of a fault in said valve position sensing means when said predetermined pressure value does not exceed said sensed pressure value.

4. The apparatus of claim 1, wherein said fault indicating means further comprises:
   means for incrementing an occurrence counter when said predetermined pressure value exceeds said sensed pressure value;
   means for decrementing said occurrence counter when said predetermined pressure value does not exceed said sensed pressure value;
   means for indicating the presence of a fault in said valve position sensing means when said occurrence counter exceeds a predetermined count value; and
   means for indicating the non-existence of a fault in said valve position sensing means when said occurrence counter does not exceed said predetermined count value.

5. A method for determining the integrity of a measurement of an position of a valve regulating the air inlet into an intake manifold of an internal combustion engine, comprising the steps of:
   sensing the position of the valve;
   sensing the pressure of the air in the intake manifold;
   determining a valve position above which the pressure of the air in the intake manifold will always be above a predetermined pressure threshold;
   comparing the sensed pressure of the air in the intake manifold with the predetermined pressure threshold while the sensed position of the valve is above the determined valve position; and
   indicating a fault in the sensed value of the position of the valve when the sensed pressure of the air in the intake manifold is less than the predetermined pressure threshold.

6. The method of claim 5, wherein the valve position determining step further comprises the step of sensing engine speed, and wherein the valve position is determined as a predetermined function of said sensed engine speed.

* * * * *